Figure 1:
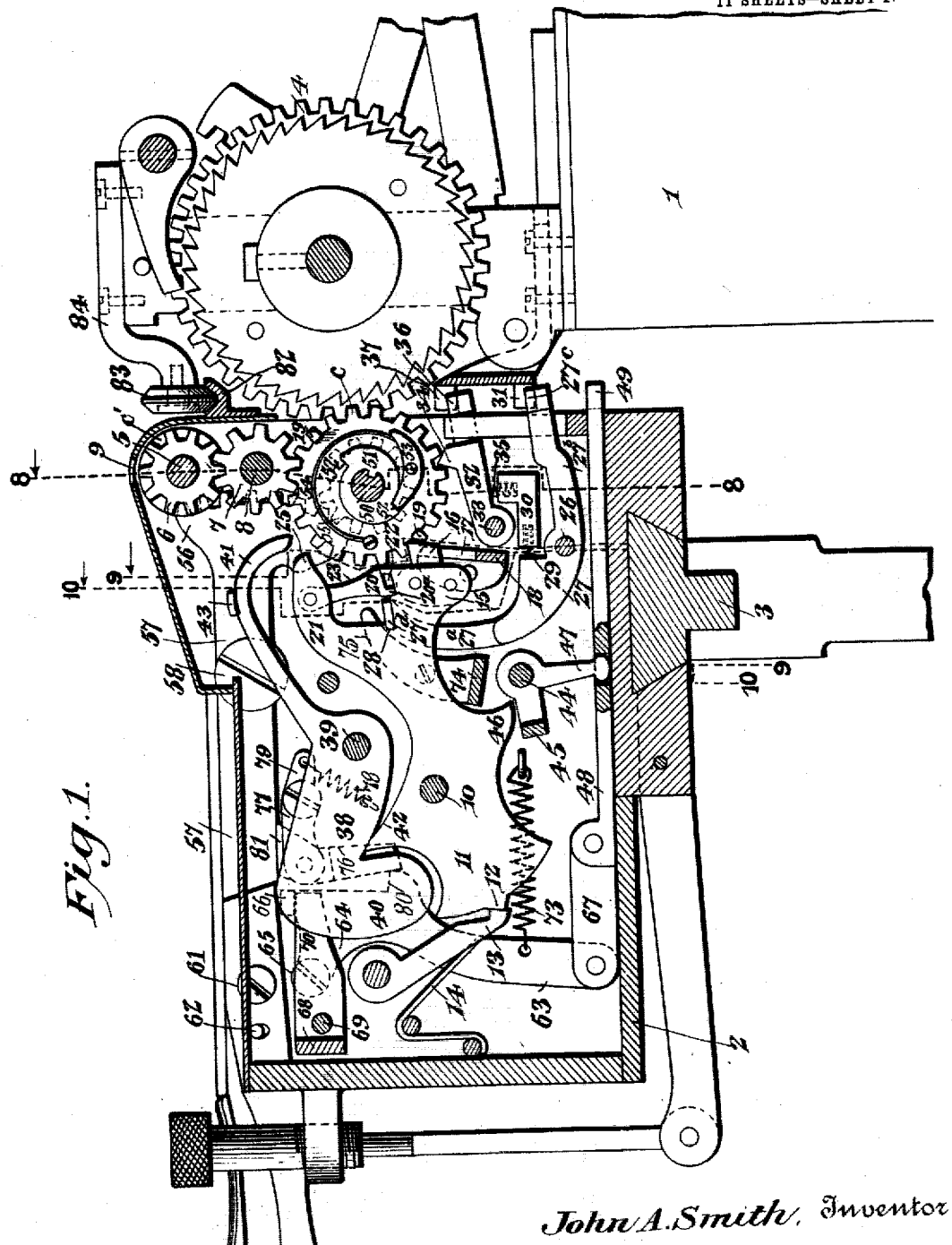

No. 825,494.  PATENTED JULY 10, 1906.
J. A. SMITH.
COMPUTING MECHANISM.
APPLICATION FILED JAN. 5, 1905.
11 SHEETS—SHEET 1.

John A. Smith, Inventor

Witnesses

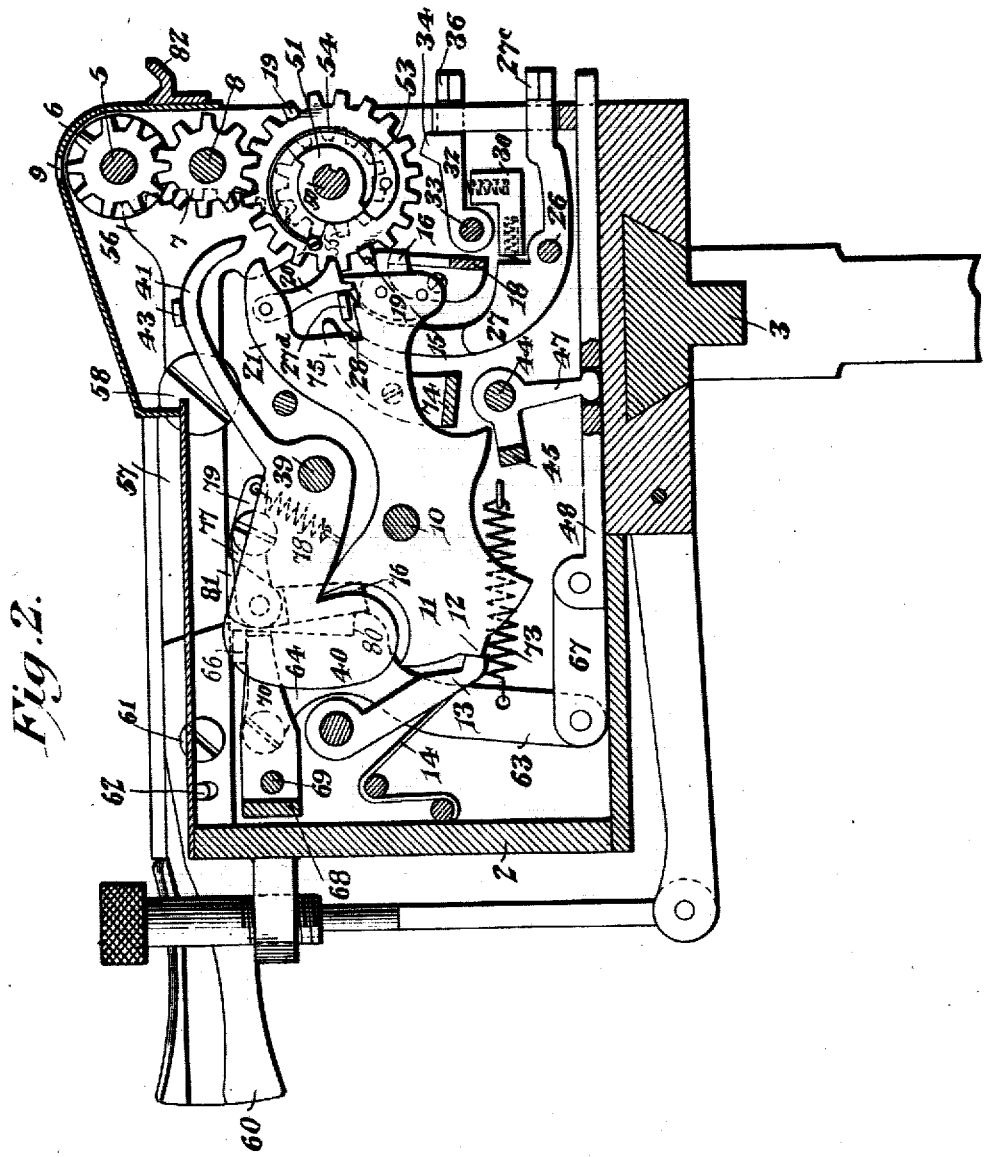

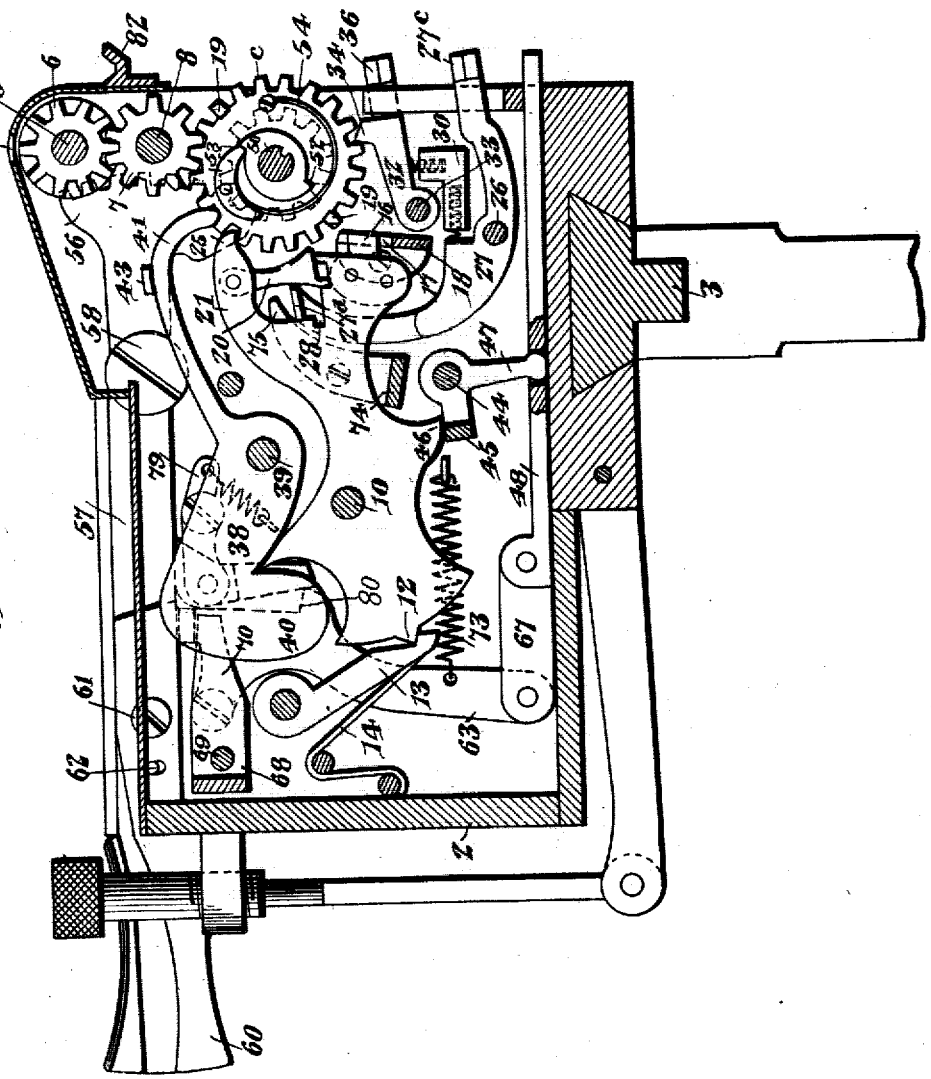

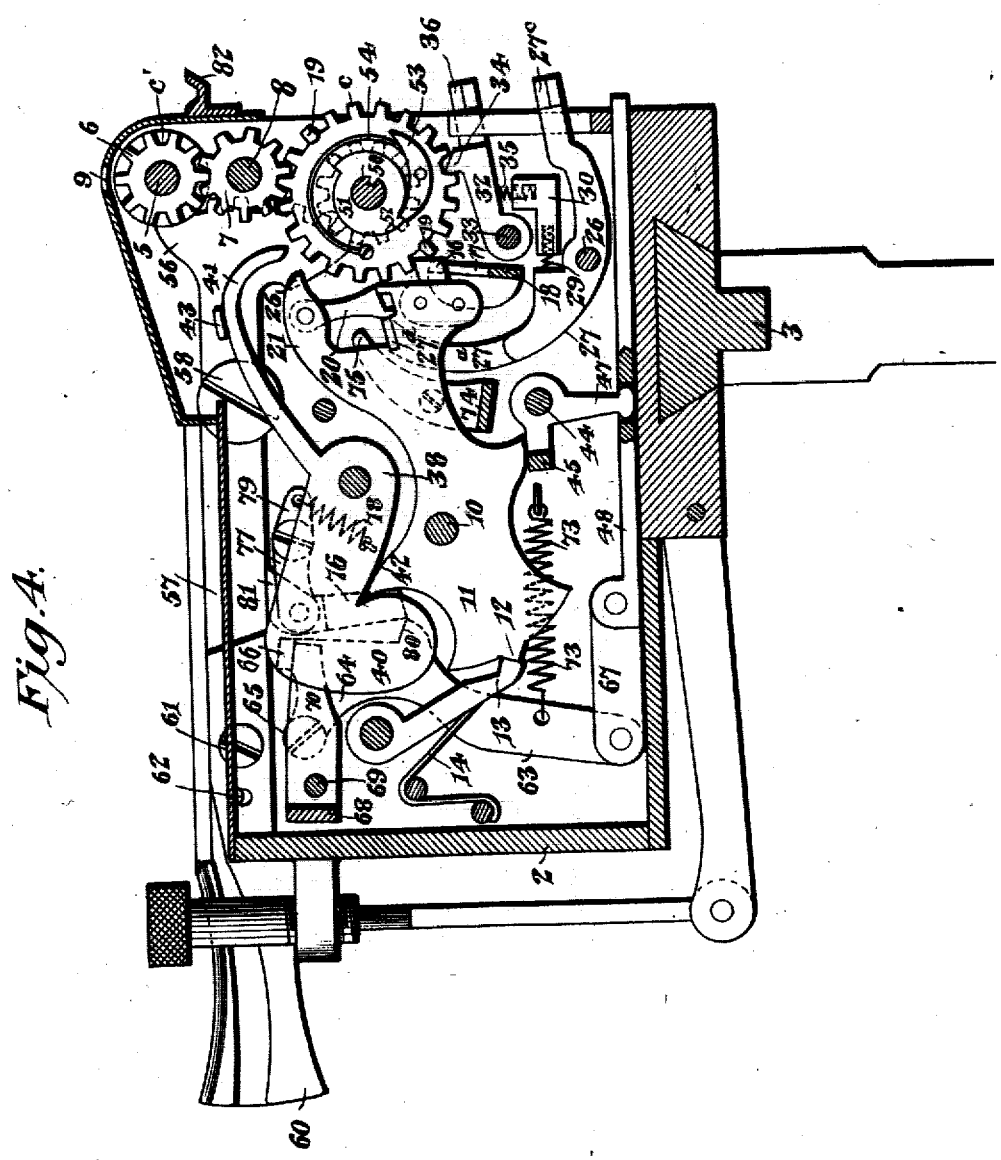

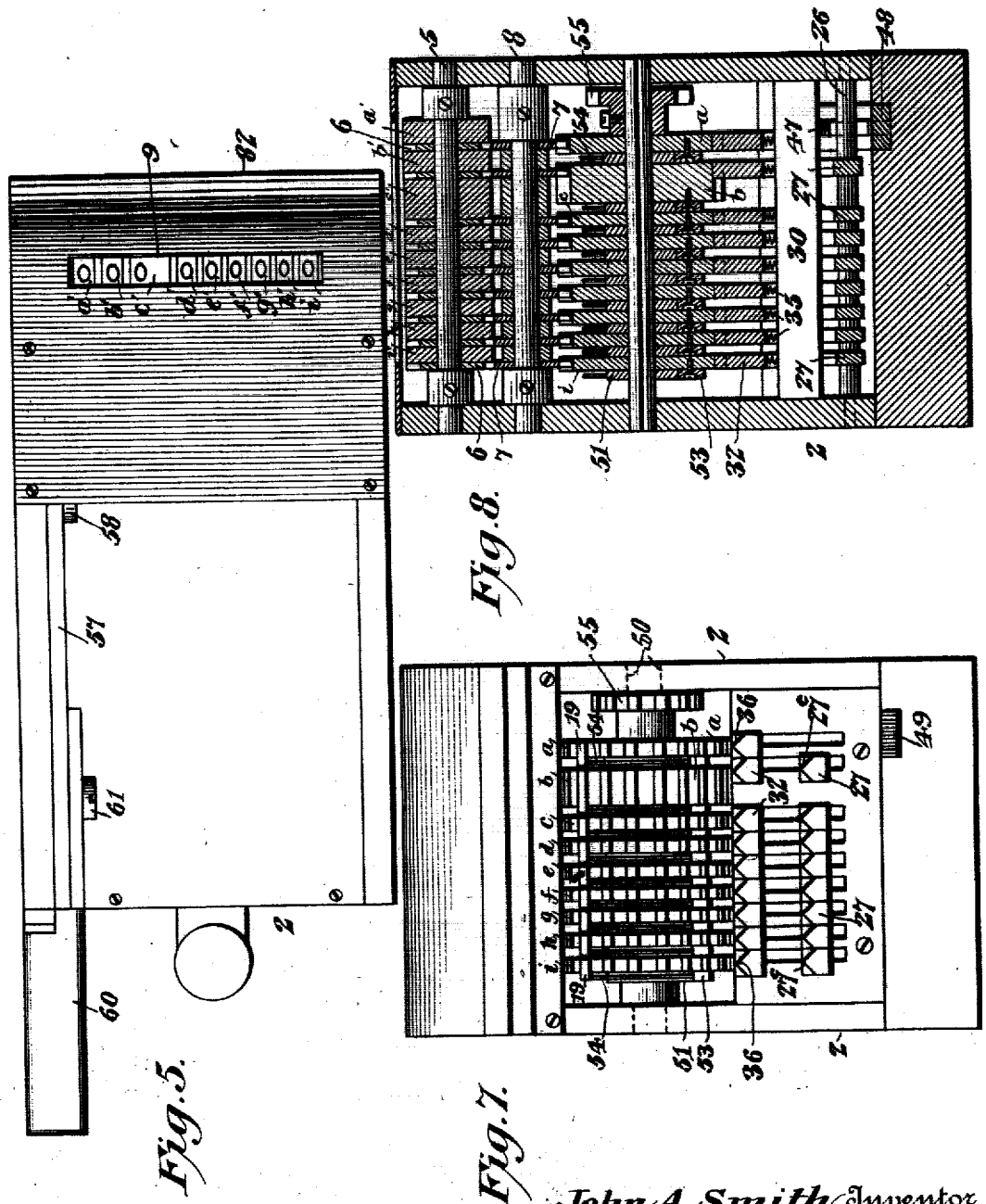

No. 825,494. PATENTED JULY 10, 1906.
J. A. SMITH.
COMPUTING MECHANISM.
APPLICATION FILED JAN. 5, 1906.
11 SHEETS—SHEET 6.
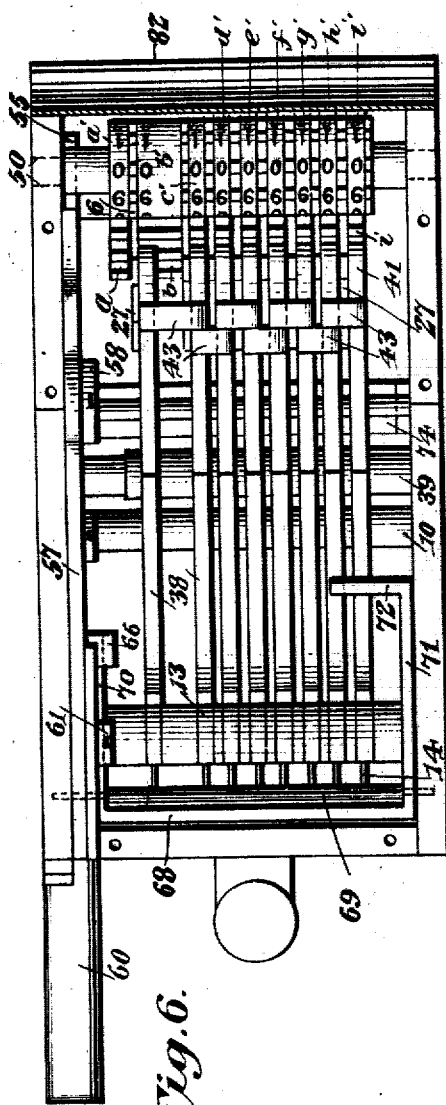
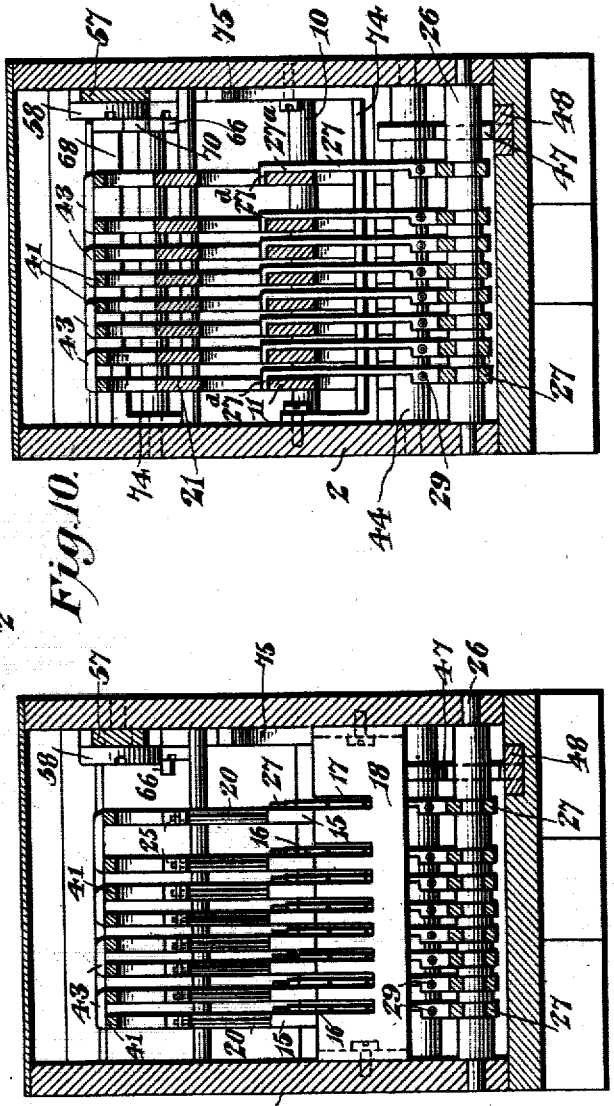
Witnesses
Jas. F. M°Cathran
Louis G. Julihn
John A. Smith, Inventor
By C. G. Siggers
Attorney

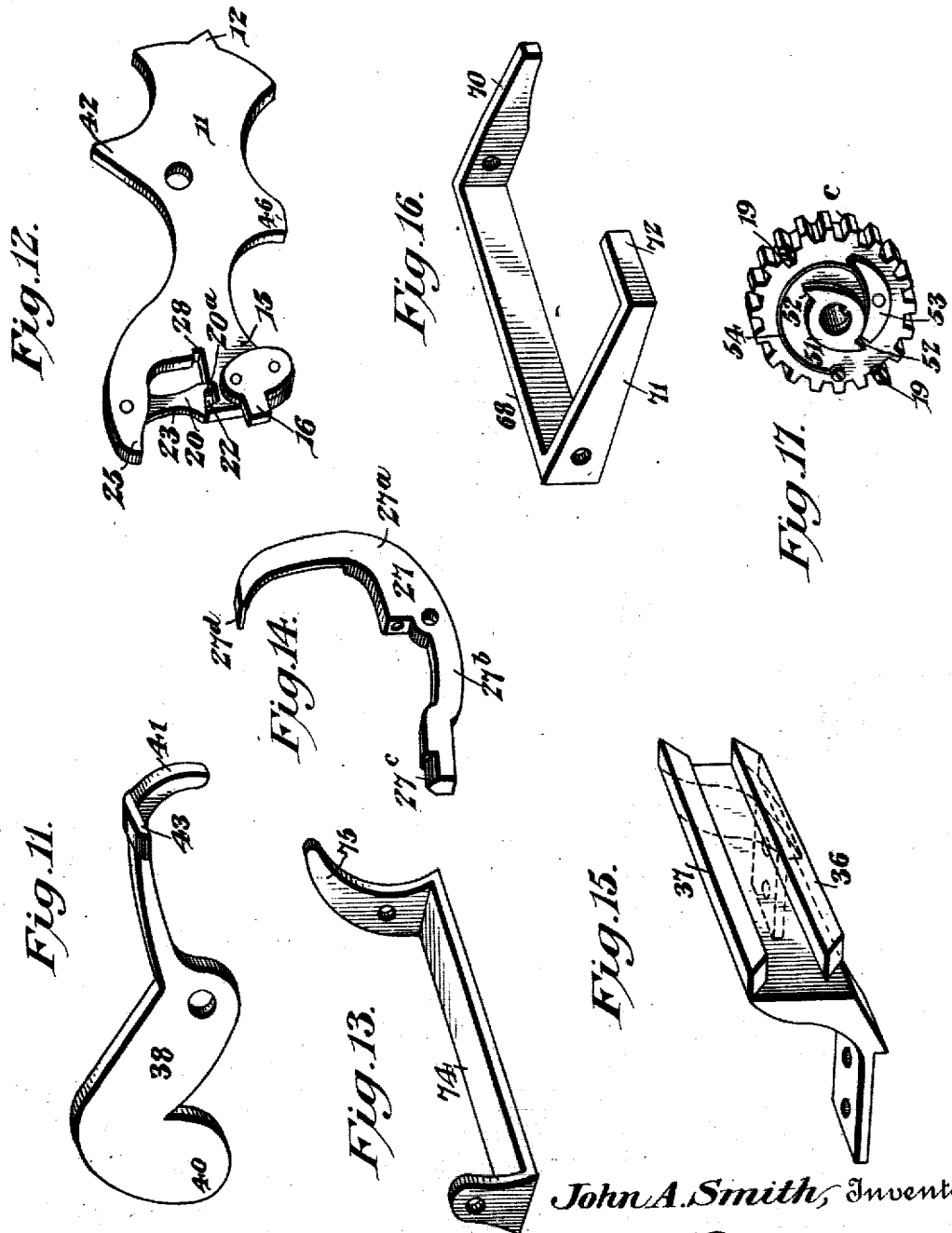

No. 825,494. PATENTED JULY 10, 1906.
J. A. SMITH.
COMPUTING MECHANISM.
APPLICATION FILED JAN. 5, 1905.

11 SHEETS—SHEET 8.

Witnesses
Jas. K. McCathran
Louis G. Julihn

John A. Smith, Inventor
By E. G. Siggers
Attorney

No. 825,494. PATENTED JULY 10, 1906.
J. A. SMITH.
COMPUTING MECHANISM.
APPLICATION FILED JAN. 5, 1905.

11 SHEETS—SHEET 9.

Witnesses
Jas. K. McCathran
Louis G. Julihn

John A. Smith, Inventor
By C. G. Siggers
Attorney

No. 825,494. PATENTED JULY 10, 1906.
J. A. SMITH.
COMPUTING MECHANISM.
APPLICATION FILED JAN. 5, 1905.

11 SHEETS—SHEET 10.

Witnesses
Jas. H. McCathran
Louis G. Julihn

John A. Smith, Inventor
By C. G. Siggers
Attorney

No. 825,494. PATENTED JULY 10, 1906.
J. A. SMITH.
COMPUTING MECHANISM.
APPLICATION FILED JAN. 5, 1905.

11 SHEETS—SHEET 11.

John A. Smith, Inventor

Witnesses

UNITED STATES PATENT OFFICE.

JOHN ASBURY SMITH, OF CLEVELAND, OHIO, ASSIGNOR TO ELLIOTT-FISHER COMPANY, OF NEW YORK, N. Y., A CORPORATION OF DELAWARE.

COMPUTING MECHANISM.

No. 825,494.　　　　Specification of Letters Patent.　　　　Patented July 10, 1906.

Application filed January 5, 1905. Serial No. 239,773.

*To all whom it may concern:*

Be it known that I, JOHN ASBURY SMITH, a citizen of the United States, residing at Cleveland, in the county of Cuyahoga and State of Ohio, have invented a new and useful Computing Mechanism, of which the following is a specification.

This invention relates to a computing device, which, while capable of use in many different relations, is designed particularly as part of a combined calculating and recording machine of that type in which the recording mechanism is in the form of a type-writing machine.

The objects of the invention, stated generally, are to reduce to a minimum the possibility of error, to facilitate the reading of the registered results of the computation effected, and to reduce as much as possible the movement or throw of the primary elements of the mechanism when the computing device is operated.

Stated somewhat more specifically, the leading objects of the invention are as follows:

First. To decrease the resistance opposed to the operation of the device and to locate the registering-wheels in such position that the reading-line or registered number will not be obscured by shadows. These ends are attained by gearing an alined series of registering wheels or disks located at the extreme upper front corner of the computing-device casing with a series of somewhat larger wheels. Each of these last-named or primary wheels when given a half-rotation effects the complete rotation of the appropriate registering-wheel to present the digits "0" to "9," inclusive, before the sight-opening of the casing in succession, the carrying mechanism for each denomination being arranged for automatic actuation at the completion of each full movement of a registering-wheel or each half-rotation of a primary wheel.

Second. To provide means whereby the transfer mechanism will be locked against premature action and will be automatically unlocked and moved into engagement with a wheel to hold the latter when the locator for said wheel is withdrawn to permit the advance of the wheel by the transfer mechanism. This object is attained by providing each wheel with a locator normally holding it against accidental movement and with a transfer-lever equipped with a transfer-dog. The lever is held positively in an inoperative position by a locking member. When the locator is withdrawn from the wheel to eliminate this element of resistance to the movement of the latter, the locking member is simultaneously operated to release the transfer-lever and to throw the transfer-dog into engagement with the wheel. The dog thus becomes a retaining device for the wheel in lieu of the locator and subsequently advances the wheel when the transfer-lever is operated.

Third. To provide automatic means which when any one of the wheels receives movement from another wheel incidental to the operation of carrying, the wheels thus advanced and all the wheels of higher order will be simultaneously locked against movement and incidentally to reduce to a minimum the number of parts depending for their operation upon some agency outside of the computing device. To attain these ends, a series of locking-levers for the primary wheels are so mounted and related within the casing that whenever a wheel is carried the transfer-lever which effects the carrying will automatically operate a locking-lever to throw the latter into engagement with the wheel, and thus lock the same securely in its carried position. The locking-lever thus operated will simultaneously automatically swing the several locking-levers to the left thereof for the purpose of moving them into locking engagement with the several wheels of higher order than the one carried, assuming, of course, that these other levers have not already been swung to their locking positions. The provision of these wheel-locking levers makes it impossible for a wheel to be carried accidentally by the stopping of a wheel in the "9" position, at which point it engages the transfer mechanism with considerable impact. Therefore the necessity for extending the transfer-levers above the computing-device casing and for effecting their slight depression by an outside agency to prevent the impact above referred to is obviated.

Fourth. To decrease the throw of the resetting-lever. This end is attained by gearing the resetting-lever to the primary wheels, which need only be given a half-rotation to effect the complete resetting of the registering-wheels.

Fifth. To provide means operated by the resetting-lever to automatically unlock the transfer-levers in order to permit them to swing as the wheels move from "9" to "0" during the resetting operation. This end is attained by mounting a swinging unlocking member in position to be engaged and swung by the resetting-lever to move the several locking devices out of engagement with the transfer-levers immediately prior to the movement of the latter.

Sixth. To provide means operated by the resetting-lever at the termination of the resetting operation for restoring the locking-levers to their normal or unlocked positions in the event of their failure to swing back when the transfer-levers are elevated. This end is attained by providing a swinging retractor which is operated by the resetting-lever as the latter completes its retractile movement and which when thus operated depresses the rear ends of the locking-levers and raises the front ends thereof out of engagement with the wheels.

Other objects of the invention and additional structural features will be pointed out during the succeeding description, and the invention in its various aspects will be succinctly defined in the appended claims.

Figure 18:
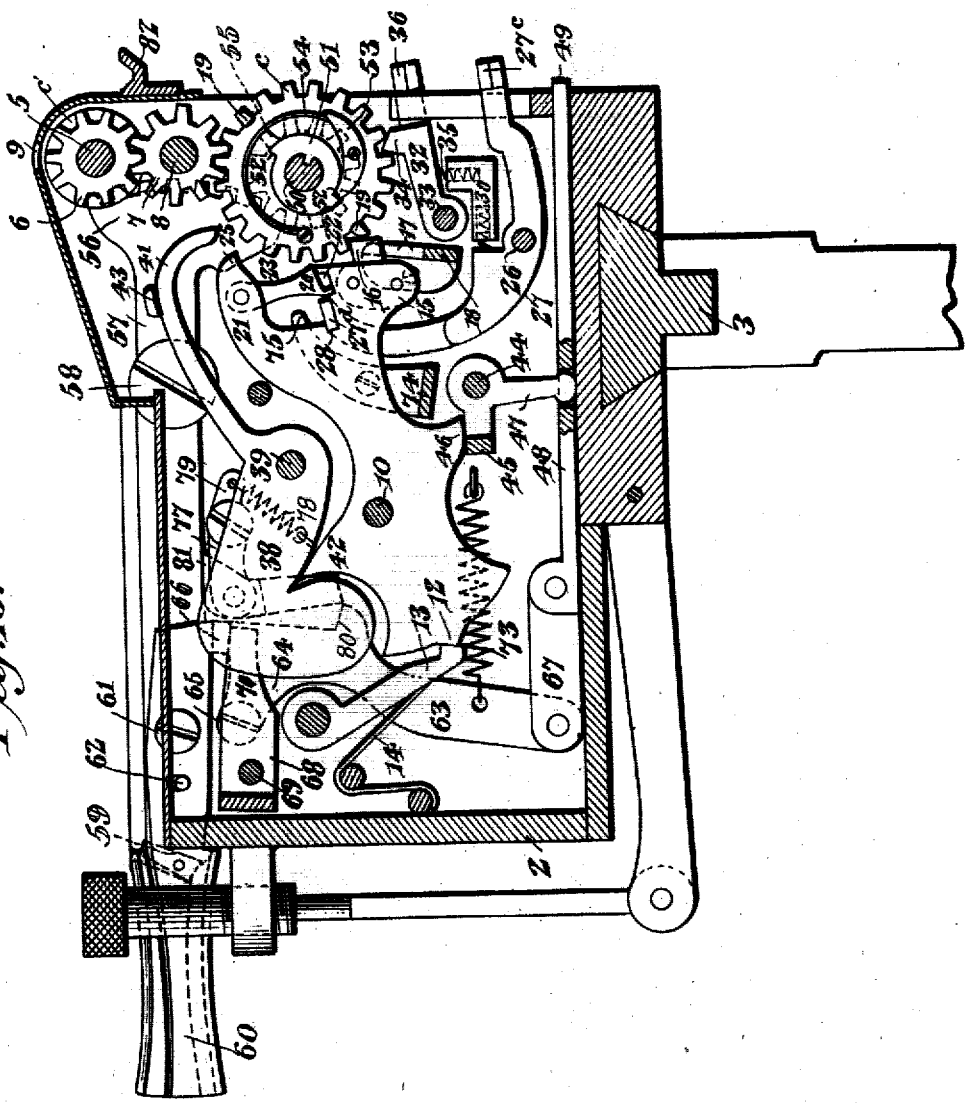
Figure 19:
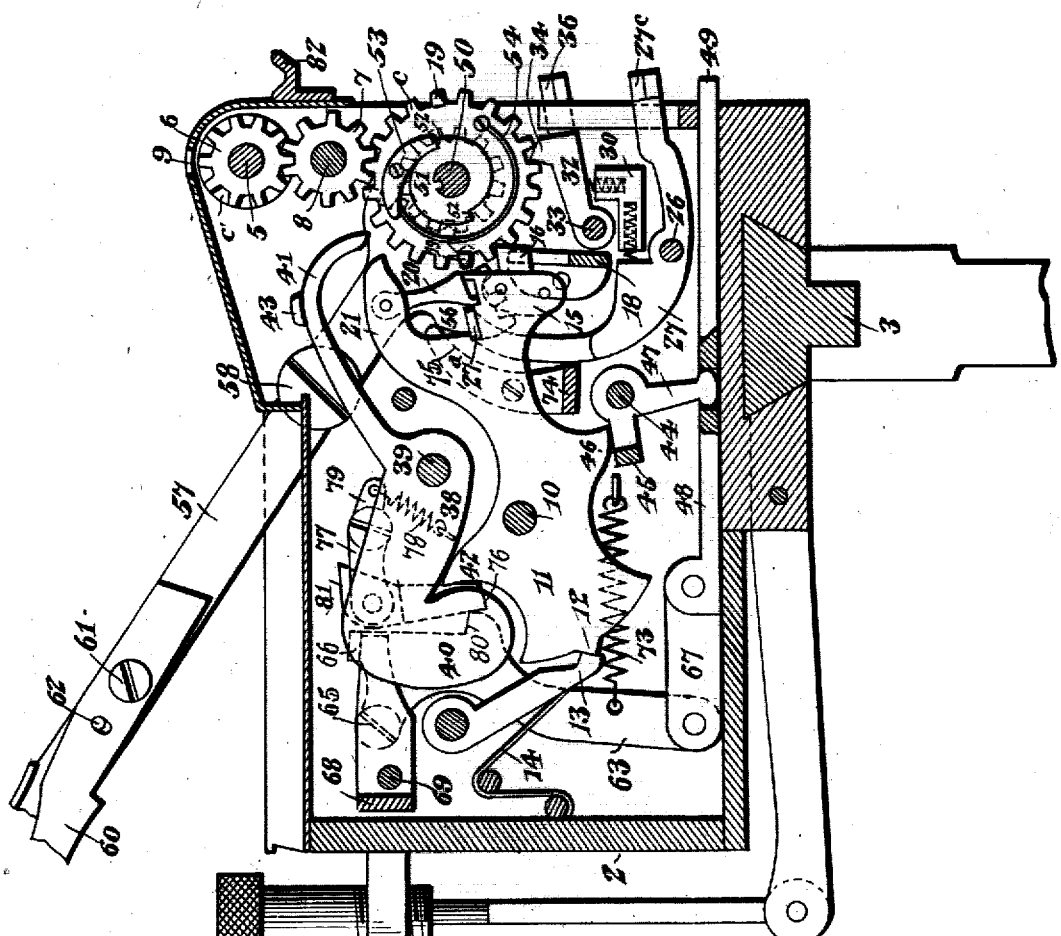
Figure 20:
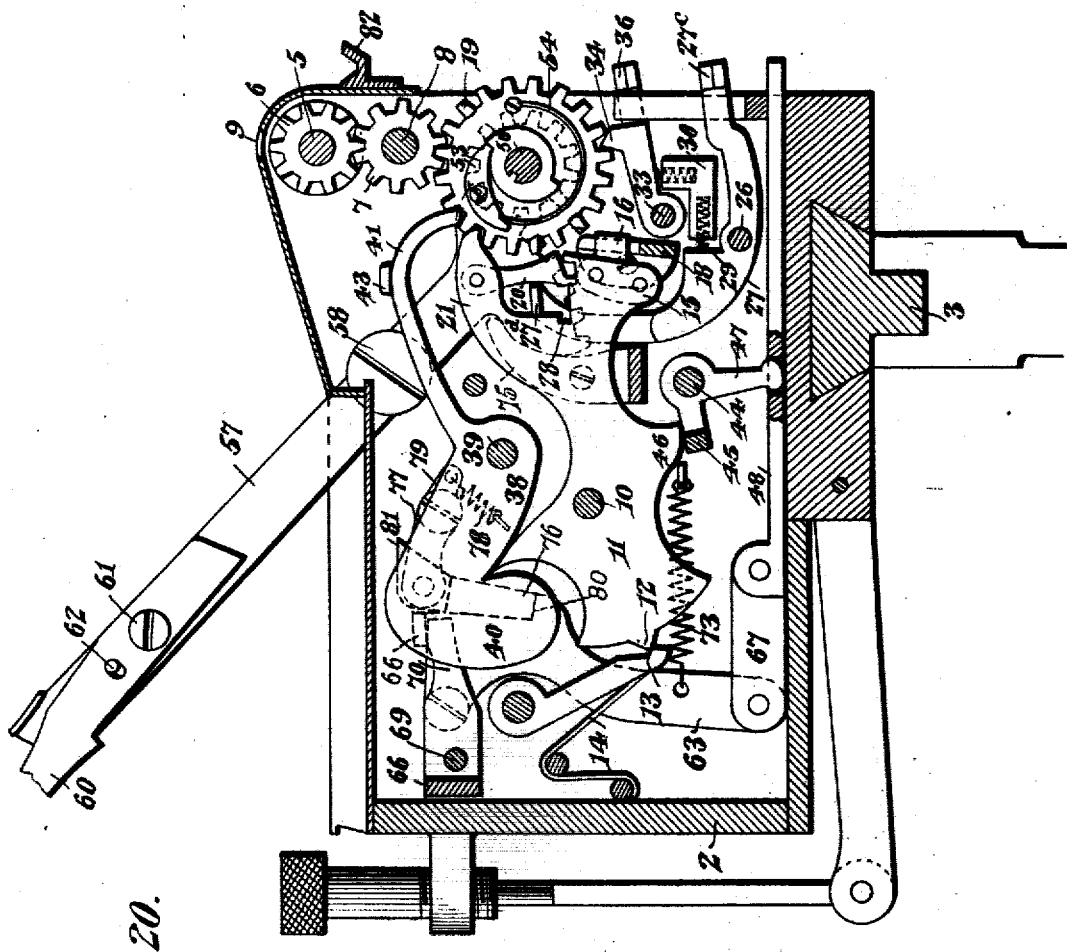
Figure 21:
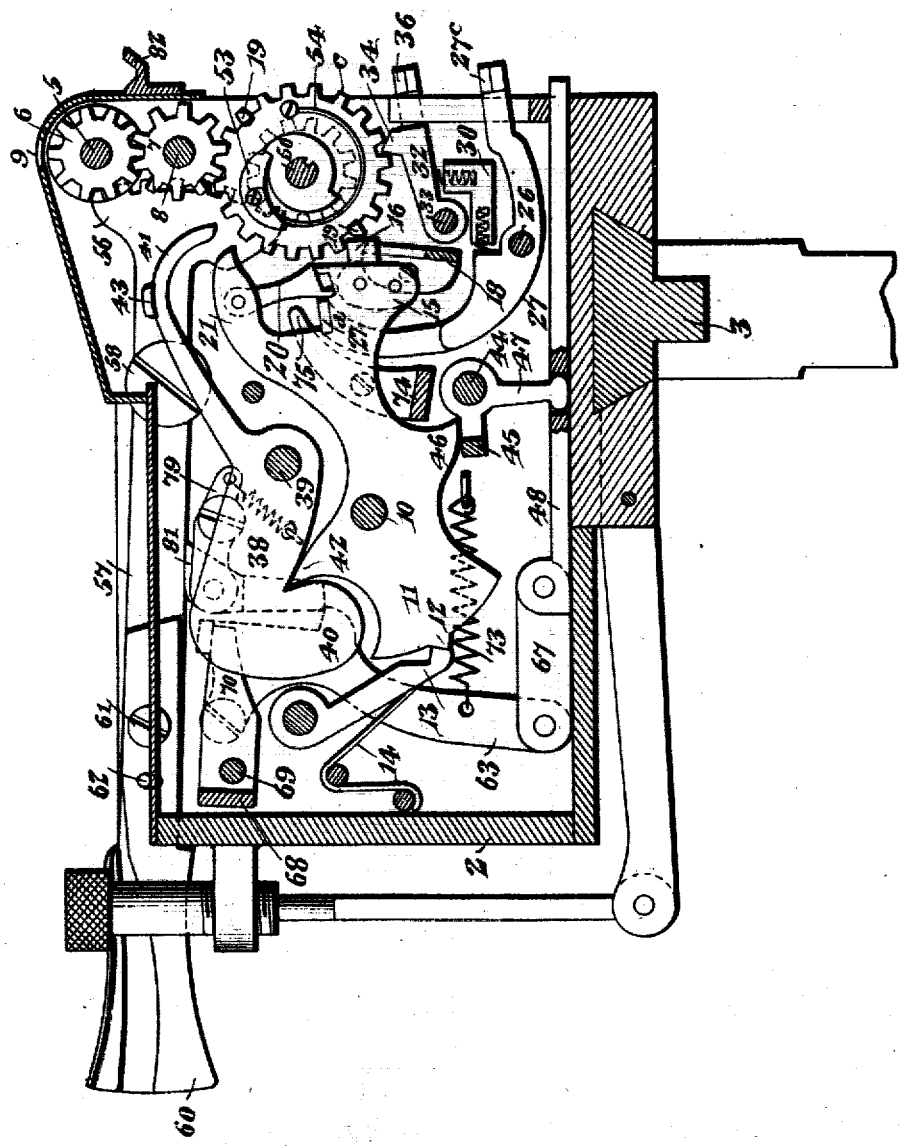

In the accompanying drawings, Figure 1 is a longitudinal sectional view through the computing device, showing a portion of the mechanism which is preferably employed to effect its operation, the parts of the computing device being shown in normal position—that is to say, in the positions they assume before a computation is commenced—all of the wheels registering "0" at the sight-opening. Fig. 2 is a longitudinal section of the computing device with the illustrated wheel registering "9," the locator depressed, the transfer-lever unlocked, and the transfer-dog thrown into engagement with the wheel. Fig. 3 is a similar view showing the positions assumed by the parts at the completion of the transfer or carrying operation. Fig. 4 is another view of the same character, showing the manner in which the transfer-levers and locking-levers are restored to their normal positions by the actuation of the rocker-slide projecting through the front of the casing. Fig. 5 is a plan view of the computing device. Fig. 6 is a similar view with the top of the casing removed. Fig. 7 is a front elevation of the computing device. Fig. 8 is a transverse section on the line 8 8 of Fig. 1. Fig. 9 is a similar view on the line 9 9 of Fig. 1. Fig. 10 is another transverse section on the line 10 10 of Fig. 1. Fig. 11 is a detail perspective view of one of the locking-levers. Fig. 12 is a similar view of one of the transfer-levers. Fig. 13 is a detail view of the unlocking-yoke for the transfer-levers. Fig. 14 is a similar view of one of the members which serve to lock a transfer-lever and to shift a transfer-dog into engagement with a wheel. Fig. 15 is a detail perspective view of the device which depresses the locators and swings the vibrators to release the transfer-levers. Fig. 16 is a detail view of the retractor for the locking-levers. Fig. 17 is a detail view showing the relation of one of the primary wheels and its resetting-pawl to the associated resetting-cam. Fig. 18 is a longitudinal sectional view of the computing device in the first resetting position—that is to say, with the transfer-levers and locking-levers restored to their elevated positions by the manipulation of the latch-lever preliminary to the actuation of the resetting-lever. Fig. 19 is a similar view with the parts in the second resetting position, the resetting-lever being partially elevated and disposed in engagement with the unlocking device for the transfer-levers. Fig. 20 is still another section of the computing device with the parts in the third resetting position, the resetting-lever having operated the unlocking device to release the transfer-levers and having also restored the wheels to "0" and incidentally caused the transfer-levers and locking-levers to move down into locking engagement with the primary wheels, and Fig. 21 is a section showing the parts in the last resetting position, the resetting-lever having been moved back almost to its normal position and having effected the restoration of the transfer-levers and locking-levers to their normal elevated positions.

Each part is indicated by the same character throughout the several views.

As already stated, the computing device or mechanism to the improvement of which the present invention is directed is designed more particularly for use in connection with a type-writing machine equipped with operating mechanism, including the numeral-keys of the type-writer, which impart differential movement to an actuator in the form of a master-wheel which is presentable in succession to the wheels of the computing device as the printing-point of the type-writer changes under the action of the carriage-feeding mechanism. The structure, therefore, will be described as an adjunctive organization of a combined type-writing and calculating machine, it being understood, however, that the computing device may be employed alone or in environments other than that in which it is here described.

In Fig. 1 of the drawings, 1 indicates a portion of the laterally-movable carriage of a Fisher type-writer, and 2 the casing of the computing device mounted in rear of the carriage upon a bar 3. The carriage 1 moves relative to the computing device for the purpose of presenting the master-wheel 4 to the several primary wheels of the computing device in succession. The master-wheel 4 is operatively related to each of the numeral-keys in a manner which need not be described, and upon the depression of a key to print a numeral said master-wheel is rotated a distance corresponding to the value of the key depressed. In other words, the keys impart differential movement to the master-wheel, the "1" key effecting a single increment of rotation and the other keys similarly effecting a successively greater movement of the wheel corresponding with the increase in value of the keys.

The computing device includes a series of denominational members or primary wheels $a, b, c, d, e, f, g, h$, and $i$, having different denominational positions—as, for instance, hundredths, tenths, units, tens, hundreds, thousands, ten thousands, hundred thousands, and millions—the tenths-wheel being of double width to accommodate the decimal space. These primary wheels are engaged directly by the master-wheel 4 and are advanced thereby. At the upper front corner of the casing 2, which is slightly extended for their accommodation, is a second series of denominational members in the form of registering wheels or disks $a', b', c', d', e', f', g', h'$, and $i'$, corresponding in denominational position with the several primary wheels. The registering wheels or disks are loosely mounted on a shaft 5, and each is formed with or fixed to a gear-wheel 6, geared to the primary wheel by an intermediate idler 7, the several idlers or gears 7 being mounted on a shaft 8, preferably directly below the shaft 5 of the registering-wheels. As shown in Fig. 6, the registering-wheels $a' b'$, &c., are each equipped with a peripheral series of digits "0" to "9," inclusive, one digit of each wheel or disk being observable through a sight-opening 9 in the top of the casing 2, the gears 6 being comparatively narrow in order to enable comparatively wide registering wheels or disks bearing digits of maximum size to be employed. It may be stated in passing that this arrangement is highly advantageous, because when the registering-wheels are in the form of toothed wheels the digits are necessarily exhibited upon the ends of the teeth and are therefore of very small size. By the arrangement adopted—that is to say, by having the digit-bearing portions of the registering-wheels in the form of disks—the size of said wheels may be, as they are in the present instance, considerably decreased without proportionately decreasing the dimensions of the digits exhibited thereon.

By reason of the gearing described each registering-wheel $a' b'$, &c., will make two complete rotations for each single rotation of the corresponding primary wheel $a$ or $b$, &c., and both the registering-wheels and the primary wheels will rotate in the same direction. Each registering-wheel is arranged to make nine-tenths of a complete rotation independently of the other of said wheels to present its digits successively before the sight-opening 9, and during its last increment of movement the next registering-wheel to the left, or the wheel of next higher order or denomination, is moved a single increment or step, after which the first-named wheel may again rotate independently for nine-tenths of a complete rotation before the adjacent wheel to the left is again advanced a single step. Since the wheels of the entire series are related to one another in the manner stated, it follows that mechanical computations in addition may be effected by moving the wheels corresponding in order to the order of the digits composing the numbers to be added a number of increments corresponding to the unitary values of such digits. Thus if it is desired to add twenty-three and forty-two, the ciphers of all the wheels being opposite the sight-opening, the wheel of the second order—to wit, the tens-wheel—will be rotated two increments, presenting the digit "2" opposite the sight-opening. The units-wheel of the first order will now be rotated three increments or spaces and the numerals observable through the opening in the casing will read "23," corresponding to the first number. The second number, "42," will now be added by imparting to the tens-wheel four additional increments of movement and to the units-wheel two additional increments, thus causing the numerals presented before the sight-opening to read "65," the sum of the two numbers. Since the numerical value of each order or denomination in the decimal system is ten and since each wheel representing an order will during its last increment of movement be augmented by a single increment of movement of the next adjacent wheel to the left, it follows that when the number registered reaches the limit of the numerical value of a given order the rotation of the adjacent wheel to the left will effect the registration of a digit of the next higher denomination. Thus assuming the units-wheel to be given nine increments of movement, causing the presentation of the digit "9" opposite the sight-opening, the next, or tenth, increment of movement will present the "0" on said wheel before the opening, and by the automatic advance of the tens-wheel the latter will be moved a single increment to present the digit "1" before the sight-opening, the presentation of the two digits "0" and "1" in the units and tens orders effecting the registration of the number "10."

*The transferring or carrying mechanism.*— The transferring or carrying mechanism is that arrangement of parts whereby when a given registering-wheel moves from "9" to "0" the adjacent wheel of higher order will be automatically advanced a single increment. In rear of the primary wheels is disposed a transverse supporting-rod 10, upon which are mounted a series of independent transfer-levers 11, one of these levers being arranged opposite each of the primary wheels with the exception of the wheel a, for which no lever is provided.

The transfer-levers are arranged to swing from the rod 10, and each is formed with a pointed tailpiece 12, engaged by a swinging detent 13, urged to its engaging position by a spring 14 and designed to yieldingly retain the lever at either limit of its movement. The levers 11 are of irregular form and each is provided at its front end with an arm 15, to which is attached in a laterally-offset position (see Fig. 12) a contact-plate 16, extended between a pair of primary wheels and also received in one of a series of guide openings or notches 17 in a guide-bar 18, extending across the casing. (See Figs. 1 and 9.) The front end of each contact-plate 16 is arranged to be engaged by either of a pair of lugs or projections 19, preferably formed integral with a primary gear and extending laterally from a side face thereof at diametrically opposite points. (See Figs. 1 and 9.) This engagement of a projection 19 with the contact-plate 16 of the transfer-lever does not occur, however, until the primary wheel has moved nine increments, the purpose of the engagement being to swing down a transfer-lever for the purpose of effecting a single increment of movement of the adjacent primary wheel to the left of the primary wheel which moves the transfer-lever, this advance or carrying of the adjacent primary wheel of the next higher order or denomination effecting a corresponding advance of the registering-wheel geared thereto. At this point attention may be directed to the fact that the carrying or transfer operation takes place each time a registering-wheel makes one complete rotation, and as this carrying is effected by the primary wheel the latter must necessarily be provided with two lateral projections or carrying devices, since it makes one-half only of a complete rotation between carrying operations. The connection between each transfer-lever and the wheel served or carried by it is established through the medium of a transfer-dog 20, having a flat lower end designed to extend over and engage one of the peripheral teeth of the adjacent primary wheel. The dog 20 is pivotally mounted at its upper end upon the arm 21, formed at the front end of the transfer-lever above and in spaced relation to the arm 15, the swinging movement of the dog relative to the lever being limited by a stop 20ª, extending from the lower end of the dog and engaging a recess 22 in the upper edge of the arm 15. (See Figs. 1 and 12.)

The front face 23 of each transfer-dog is curved longitudinally, so that that part of the dog which engages a primary wheel has the form of a tooth. (See Fig. 2.) Similarly, the rear face of each dog is curved, so that it will describe an arc substantially concentric with the axis of the transfer-levers when the dog is in its wheel-engaging position. Assuming that the primary wheel (shown in Fig. 2) is the units-wheel and that it has rotated nine increments to exhibit the digit "9" on the units registering-wheel before the sight-opening 9, it will be seen that the next increment of movement of the primary wheel will cause one of the projections 19 thereon by engagement with the contact-plate 16 to swing down a transfer-lever. As the transfer-dog 20 of this lever will be in its engaging position, as shown in Fig. 2, and as such engagement will be with the tens-wheel, the described advance of the units primary wheel and the consequent swinging of the tens transfer-lever will advance the tens primary wheel one increment, so that the tens registering-wheel will be moved to register "1" before the sight-opening, while the units registering-wheel is moving from "9" to "0". When the transfer-lever is operated in this manner, the carrying-dog gradually moves out of engagement with the tens-wheel, for the reason that its front face is engaged by a tooth of the wheel, which acts as a cam serving to swing back the dog, and thus effect the complete disengagement thereof by the time the carrying operation is completed. Before this disengagement is effected, however, the front end 25 of the transfer-lever will engage the upper corner of a tooth of the tens-wheel and will exert more or less downward pressure thereon, so that notwithstanding the disengagement of the transfer-dog 20 the operative connection between the transfer-lever and the wheel will be maintained, thus insuring the transfer of a complete increment of movement to said wheel. At the completion of the movement the side face of one of the teeth of the tens-wheel will be brought into engagement with the end 25 of the transfer-lever, as shown in Fig. 3, and the projection 19 on the units-wheel will have moved out of engagement with the contact-plate of said lever. In this position of the parts (see Fig. 3) the tens-wheel will be locked by the transfer-lever, and the units-wheel which has just effected the operation of said lever will be capable of continued movement independently of the tens-wheel.

As the transfer-lever moves down the point of its tailpiece will swing relative to the detent 13, and as the point of the tailpiece passes the point of the detent the latter, urged upward by its spring, will exert more or less force, tending to continue the movement of the lever. This is advantageous, for the reason that in the event of slightly-premature disengagement of the projection 19 of the units-wheel from the contact-plate 16 of the lever the movement of said lever would, nevertheless, be completed, and thus a complete carrying operation would be insured.

*The mechanism for locking the transfer-levers against accidental depression and for positively bringing the transfer-dogs into engagement with the primary wheels.*—It is desirable to positively lock the transfer-levers in their normal elevated positions, and it is also desirable to positively move the transfer-dogs into engagement with the wheels to be carried by them. The locking of each lever and the positive movement of the dog carried thereby is effected by the same element. On a shaft 26, extending transversely of the casing 2, adjacent to the lower front corner thereof, are mounted a series of vibrators 27, corresponding in number and denominational position to the transfer-levers 11. Each of these vibrators is formed with a vertical arm 27$^a$ and with a horizontal forwardly-extending arm 27$^b$, the front extremities of the several arms 27$^b$ of the vibrators being extended through the front wall of the casing 2 and each formed with a pointed upper edge 27$^c$. The vertical arm 27$^a$ of each vibrator is reduced in thickness, as shown in Figs. 10 and 14, to permit the upper portion thereof to extend between a pair of transfer-levers and is provided at its upper extremity with a lateral extension or lug 27$^d$, extended over the lower arm 15 of a transfer-lever, as shown in Figs. 1 and 10. The rear edge of the lug 27$^d$ is normally retained in a notch 28, formed in the front edge of the transfer-lever immediately above the arm 15 thereof, this notch being of angular form corresponding to the angular form of the rear edge of the lug, so that when the parts are in engagement the transfer-lever will be positively locked against movement in either direction. Each vibrator is retained in its normal or locking position by a spring 29, backed by a bar 30, extending across the casing and bearing against a shoulder formed on the vibrator. At the proper time, however, the front end of the vibrator 27 is depressed by a vibrator-actuator 31, having the form of a horizontal bar with beveled ends, (see Fig. 15,) which is supported by and moves with the type-writing-machine carriage 1. As the carriage advances in the direction of letter-spacing the end of this bar or actuator 31 rides over and depresses the front end of a vibrator 27 in opposition to the spring 29. The vibrator is thus rocked from the position shown in Fig. 1 to that shown in Fig. 2, this movement serving to draw the locking-lug 27$^d$ out of the notch 28 in the transfer-lever to release or unlock the latter, and thus permit its subsequent depression. At the same time this movement of the vibrator presents the lug 27$^d$ to the lower end of the carrying-dog 20 and swings the latter positively to its engaging position. (Shown in Fig. 2.) The transfer-lever being thus released and the transfer-dog engaged with the wheel served by it, the carrying operation may be effected in the manner heretofore described, the units-wheel, for instance, serving to swing down the transfer-lever, whose transfer-dog will advance or carry the tens-wheel one increment. Obviously the vibrators 27 may be operated manually, since their front ends are exposed upon the exterior of the casing.

*The wheel-locating mechanism.*—To insure exact alinement of the digits opposite the sight-opening and to prevent possible reverse rotation of the wheels, a series of wheel-locators 32 are provided. These locators are in the form of independently-swinging arms mounted upon a transverse rod 33, extending across the casing above the bar 30 and each having a pointed locating-tooth 34, which engages between the teeth of one of the primary wheels $a$ $b$, &c. Each locator is urged upwardly by a spring 35 and has its front end extended through and beyond the front wall of the casing 2, where it is formed with a pointed or sharp upper edge 36, similar to the corresponding portions of the vibrators 27. (See Fig. 7.) If when a primary wheel comes to rest its movement is slightly incomplete, the locator-tooth subsequently urged upwardly between two teeth of the wheel will accurately locate the latter by reason of the camming action between the inclined faces of the locator-tooth and the adjacent wheel-teeth engaged by it. The several locators 32 are depressed to ease or relieve the resistance opposed to the movement of the number-wheels in carrying. While this may be done by hand, in practice a locator-depressing plate 37, similar to the vibrator-actuator 31, is mounted on and movable with the carriage and provided with beveled ends.

*The means for automatically locking the wheel carried and for simultaneously locking the remaining wheels of higher order to prevent accidental carrying when a wheel stops in the "9" position.*—In order that the utility of this mechanism may be comprehended, it should be remembered that when a primary wheel stops in the "9" position—that is to say, with the corresponding registering-wheel showing the digit "9" at the sight-opening—one of the projections 19 on the primary wheel will be in engagement with the contact-plate 16 of a transfer-lever. It sometimes happens that when the wheel is thus arrested in the "9" position the impact of the projection 19 against the plate 16 will be sufficiently violent to effect the accidental actuation or depression of the transfer-lever, thus causing the latter to carry the wheel served by it. To prevent this accidental carrying, it has been proposed to depress certain of the transfer-levers slightly in order to prevent their contact-plates from being struck by the projections 19 under the conditions stated. The proposed arrangement, however, contemplates the extension of the transfer-levers outside of the casing 2 and the depression thereof by an outside agency. In accordance with the present invention no provision is made for this slight movement of the contact-plates away from their normal positions; but in lieu thereof a series of locking-levers are so arranged within the casing that they will automatically lock certain of the wheels to prevent the same from being accidentally carried in the manner stated, the locking being automatically effected when any wheel is carried and serving to simultaneously lock the carried wheel or wheels and also the wheels of higher order. These locking-levers 38 (see Figs. 1, 6, 9, 10, and 11) are fulcrumed upon a shaft 39, disposed transverse of the casing above the transfer-levers. Each locking-lever is formed with a weighted rear end 40 and with a curved front end 41, which latter is designed to swing down into engagement with a primary wheel just as the latter completes its movement under the impulse of a carrying or transfer lever. The locking-levers 38 correspond in number with the transfer-levers 11 and are located directly above the latter. This arrangement is adopted in order to permit each transfer-lever when operated to transmit motion from one wheel to another to simultaneously effect the automatic actuation of the adjacent locking-lever for the purpose of swinging the latter into locking relation with the wheel to which motion is transmitted. Formed on the upper edge of each transfer-lever 11 in rear of the fulcrum thereof is a cam extension 42, engaging the under side of the weighted rear end of a locking-lever 38, as shown in Fig. 1. When the front end of the transfer-lever is thrown down in the act of carrying, the cam 42 moves up, and thus swings the locking-lever 38 to the locking position, as indicated in Fig. 3. When a locking-lever is thus operated, it automatically effects a corresponding operation of each locking-lever to the left, so that when any one of the primary wheels is moved by a transfer-lever it will be locked by a locking-lever 41, and all of the wheels of higher order will be simultaneously locked by the depression of the other locking-levers to the left. To attain this end, each lever 41 is provided adjacent to its front end with a laterally-disposed lug 43, which extends over the upper edge of the adjacent lever to the left—that is to say, the adjacent lever occupying a higher denominational position. (See Figs. 1, 6, 9, 10, and 11.) Thus when one of the locking-levers is moved to its locking position its lug 43 will depress an adjacent lever, which will in turn depress the next lever, and so on, the movements of these several levers connected by the lugs 43 being simultaneous. The locking-levers to the right of the one thrown down by a transfer-lever will remain in their elevated positions, for the reason that the lever thus thrown down to lock the carried wheel will merely move away from the overhanging lug 43 of the adjacent lever to the right. As a result of the arrangement shown it follows that the wheel to which motion is transmitted in the act of carrying will be prevented from moving beyond the proper point and that all the wheels of higher order will be locked, so that even if a projection 19 on one of the wheels should strike a sharp blow against the contact-plate of transfer-lever it will be impossible to effect a false carrying movement of any wheel.

*The means for restoring the transfer-levers and locking-levers to their normal positions under normal conditions.*—Mounted to swing from a transverse bar 44 (see Fig. 1) is a rocker 45, disposed opposite a cam-face 46, formed on each of the transfer-levers 11 in advance of their common fulcrum. When the transfer-levers, or any of them, are thrown down to their depressed positions, as shown in Fig. 3, their cam-faces 46 are moved close to or in contact with the rocker, so that when the latter is rocked back the levers will be raised or retracted to their normal positions, thus permitting the locking-lugs 27ª of the vibrators 27 to move back into engagment with the notches 28 in the levers to lock the latter in the manner heretofore described. This movement of the locking-levers withdraws the cams 42 from the rear weighted ends of the locking-levers 38, which drop back to their normal or disengaged positions. The rocker 45 is provided with a depending arm 47, connected at its lower end to a slide 48 to facilitate its actuation. This slide has a beveled front end 49 extended through the front end of the casing 2 to facilitate its actuation, it being understood that the forcing of this slide backward or inward effects the swinging of the rocker 45 to restore the transfer-levers to normal position.

When the computing device is used in connection with a type-writing machine, this slide 48 is moved in or back by a rocker-slide actuator mounted on the carriage 1. This actuator constitutes no part of the present invention and for that reason is not shown. It may be stated, however, in passing that during the retraction of the type-writing-machine carriage this actuator operates, the slide 48 to restore the transfer-levers to their elevated positions and to simultaneously unlock the wheels in order that another number may be added to the computation already effected.

*The resetting mechanism.*—The resetting mechanism is designed to clear the computing device when a given computation has been completed. At the beginning of the resetting operation the parts will be in the positions shown in Fig. 3, the transfer-levers and locking-levers being in their engaging positions. Fixed upon a rotary shaft 50, which carries the several primary wheels a b, &c., are a series of resetting-cams 51, alternating with the wheels and each formed with a pair of shoulders 52 at diametrically opposite points. The shoulders of the several cams are normally alined and occupy the positions shown in Fig. 18. This figure may be said to disclose the first resetting position, since the parts are in the positions they assume at the end of the first step of the resetting operation. Mounted to travel upon each of the resetting-cams is a resetting-pawl 53, pivoted upon the adjacent primary wheel and having its beak urged toward the periphery of the cam by a spring 54. When all of the registering-wheels are registering "0" before the sight-opening of the casing 2, the beaks of the several pawls 53, carried by the primary wheels, will be in engagement with one of the alined series of shoulders of the cams. As the wheels are advanced one or more increments the pawls will move away from the shoulders 52, and when a given computation has been completed the pawls on the several wheels will obviously occupy various positions with relation to the shoulders of the cams. Therefore if the shaft 50 is rotated in the proper direction the shoulders of the cams, moving with the shaft, will approach and engage the pawls of the wheels, and when said shoulders have arrived diametrically opposite the point from which they started each primary wheel will have been advanced a sufficient distance to cause each of the several registering-wheels to register zero.

For the purpose of imparting the necessary movement to the shaft 50 the latter is provided adjacent to one end with a pinion 55, engaged by a toothed segment 56 upon the rear end of a resetting-lever 57, fulcrumed upon a bearing-screw 58, projecting inwardly from one side wall of the casing 2. The throw of this lever is just sufficient to effect one-half of a complete rotation of the shaft 50. It therefore follows that by swinging the lever from the position shown in Fig. 18 to that shown in Fig. 20 the registering-wheels will be reset. The resetting-lever is retained in its normal position by a latch 59 in the form of a small block pivoted upon the lever and engaging a notch in the casing 2. This latch is arranged to be operated by a latch-lever 60, pivotally mounted on the resetting-lever at 61 and limited in its movement independent of the lever by a stop-pin 62 engaging a slot in the lever 60. It will be obvious that the resetting-lever cannot be operated as long as the primary wheels remain locked, and for this reason the illustrated structure includes means whereby the transfer-levers and locking-levers will be thrown up to their elevated positions by the resetting mechanism prior to the movement of the resetting-lever 57. This means includes a swinging arm 63, having an angular upper end 64, pivotally mounted upon a bearing-screw 65, projecting from a side wall of the casing 2. At the upper end of the arm 63 at a point in advance of its axis is a lug 66, disposed to be engaged by the inner or front end of the latch-lever 60, the lower end of the arm 63 being connected by a link 67 with the inner or rear end of the rocker-slide 48. Assuming that the parts occupy the positions indicated in Fig. 3 and that it is desired to reset the computing device, the end of the resetting-lever 57 is grasped. This action serves to swing the latch-lever 60 from the position shown in Fig. 3 to that shown in Fig. 18, thus causing the projection 66 to be depressed and the lower end of the arm 63 to be swung rearwardly to retract the slide 48 and operate the rocker 45. Thus the swinging of the latch-lever 60 simultaneously effects the release of the resetting-lever 57 and shifts the rocker 45 to elevate the transfer-levers 11 to their normal positions, as shown in Fig. 18. This elevation of the transfer-levers withdraws the cams 42 from the locking-levers and permits the latter to swing to their unlocked positions under the impulse of their weighted rear ends.

*The means for causing the latch-lever to release the locking-levers from the wheels.*—To avoid possible failure of the locking-levers to swing back under the impulse of their weighted ends, provision is made for positively retracting the locking-levers by means of the latch-lever 60 when the latter is swung to withdraw the latch 59 from the casing. At a point adjacent to the upper rear corner of the casing 2 is located a locking-lever retractor 68, (see Figs. 6, 16, and 18,) mounted to swing from a shaft 69 and provided adjacent to the opposite sides of the casing with arms 70 and 71, the latter having an angular end 72, which projects over the rear ends of one or two of the locking-levers at the left-hand end of the series. (See Fig. 6.) The front end of the arm 70 of the retractor at the other side of the casing 2 is disposed under the lug 66 on the arm 63. Therefore when the latch-lever 60 is swung in the manner described to release the latch and to operate the rocker 45 it also causes the locking-arm retractor 68 to rock, the angular end 72 of the arm 71 depressing the rear ends of the locking-levers engaged by it. The front ends of these locking-levers are thus swung up, and this motion is communicated to the entire series of levers by reason of the fact that as each is elevated it strikes the lateral projection 43 of the adjacent lever of lower order and moves said lever with it. Thus it will be seen that the swinging of the latch-lever at the beginning of the resetting operation effects, first, the withdrawal of the latch to release the resetting-lever; second, the swinging of the rocker 45 to elevate the transfer-levers, and, third, the swinging of the retractor 68 to effect the simultaneous retraction of the several locking-levers, these three functions, however, being performed simultaneously. The parts will now be in the positions indicated in Fig. 18, and the second step of the resetting operation will next be performed. This step consists in elevating the resetting-lever 57 to rotate the shaft 50, and thus cause the cams thereon to pick up the resetting-dogs 53 and move the same around until the wheels are made to register zero in the manner heretofore explained. As soon as the latch-lever is moved out of engagement with the arm 63 by the upward movement of the resetting-lever 57 the arm 63, the slide 48, and the rocker 45 will be restored to their normal positions by a retracting-spring 73, connected at one end to the casing and at its opposite end to the arm 63. (See Fig. 19.) When the resetting-lever 57 has reached the position shown in Fig. 19, the parts will be in what is known as the "second" resetting position, the resetting-cams being two increments removed from their final resetting positions. In other words, the registering-wheels will be showing "8's" before the sight-opening and a projection 19 on each of the primary wheels will be one step or increment removed from the adjacent projection 16 of a transfer-lever. When the next step or increment of movement is imparted to the primary wheels by the resetting-lever, these projections 19 will move into engagement with the contact-plates 16 of the transfer-levers and the several wheels will be in the "9" position.

*The means operated by the resetting-lever to unlock the transfer-levers.*—We have already seen that whenever a primary wheel moves from "9" to "0" in the normal operation of the device a projection 19 thereon engages a contact-plate 16 on a transfer-lever and shifts the latter to its depressed position. It follows that during the resetting operation which is now being described the same operation necessarily takes place—that is to say, as the primary wheels are being reset by the transfer-lever their movement from "9" to "0" is necessarily accompanied by the depression of the transfer-levers. We have also seen, however, that when the transfer-levers are in their elevated positions, as shown in Fig. 19, they are locked by the lugs 27ª on the vibrators 27. It is therefore necessary to provide means whereby the resetting mechanism will be made to operate the vibrators 27 to release the transfer-levers 11 before the primary wheels begin their movement from "9" to "0." This end is attained by providing a swinging unlocking member or yoke 74, (see Figs. 13, 19, and 20,) pivotally mounted at its opposite ends upon the side walls of the casing and having its transverse bar disposed to engage the rear edges of the several vibrators 27 when the yoke is swung in a manner to be described. The right-hand end of the yoke is extended beyond the axis thereof to form an unlocking arm or cam 75, extended into the path of the segment 56 of the resetting-lever. When the resetting-lever 57 is swung up to the position indicated in Fig. 19, the primary wheels will be in the "8" position and the segment 56 of the resetting-lever will engage the upper end of the arm 65 of the unlocking-yoke 74. This position of the parts is shown in Fig. 19, which, as before stated, is the second resetting position. As the upward movement of the resetting-lever continues the unlocking-yoke 74 will be swung, thus urging the vertical ends of the vibrators 27 forward to withdraw the lugs 27ᵈ thereof from the notches 28 in the transfer-levers. The transfer-levers will thus be released or unlocked while the wheels are moving from "8" to "9," and therefore when the wheels are moved from "9" to "0" the projections 19 thereon may cause the transfer-levers to be thrown down, the locking-levers being incidentally rocked to their engaging positions. This third resetting position of the parts is shown in Fig. 20, the resetting-lever being at one limit of its movement, the wheels registering "0" at the sight-opening, and the transfer-levers and locking-levers being depressed.

*The means for causing the return of the transfer-levers and locking-levers to normal position when the resetting-lever is moved back.*—Of course when the wheels have been reset it is necessary to restore the transfer and locking levers to their normal position before another computation can be effected. The resetting mechanism therefore includes, in addition to the latch-lever for unlocking the wheels prior to the resetting thereof, other mechanism for unlocking the wheels after the latter have been reset. This mechanism includes a block 76, pivotally mounted at the rear end of a swinging support 77, constantly urged upward by a spring 78, connected at one end to a fixed part and at its opposite end to a tailpiece 79, extended from the support 77. The block 76 is normally retained by the resetting-lever in the position shown in Fig. 3; but when the arm 63 is thrown back by the latch-lever at the beginning of the resetting operation, as shown in Fig. 18, a projection or shoulder 80 on the arm 63 moves down to the position opposite the lower end of the block 76. With the parts in this position—to wit, that shown in Fig. 18— it is evident that as soon as the resetting-lever 57 moves up the support 77 will be swung by its spring 78 and the block 76 will move over the projection 80 on the arm 63, and therefore when the said arm is retracted by the spring 73 the arm and block 76 will move back together, the upper end of the block being extended a considerable distance above the projection or lug 66. (See Fig. 19.) If now the resetting-lever having reset and locked the wheels is swung back to the position indicated in Fig. 21, which is the fourth resetting position, it will contact with the upper end of the block 76 and force the latter down, thus swinging the arm 63 to operate the rocker 45 and the retractor 68, the rocker serving to elevate the transfer-levers and the retractor simultaneously withdrawing the locking-levers from engagement with the primary wheels. As the block 76 continues to move down with the resetting-lever when the latter is restored to its normal position it will be swung slightly on its individual axis by reason of the fact that the upper face 81 is slightly inclined, and this individual movement of the block, together with the swinging of the support 77 and the arm 63 from different axes, will effect the disengagement of the block from the projection 80, the positions assumed by these parts being shown in Fig. 21. As soon as the block 76 is disengaged from the arm 63 the latter will be retracted by its spring 76, the lug 66 on the arm being presented to the latch-lever. The various parts of the device will now have been restored to their initial positions, (shown in Fig. 1,) and another computation may be inaugurated.

Adjacent to the upper front corner of the computing-device casing 2 is a grooved track 82, upon which is designed to travel an antifriction-roller 83, carried at the end of a brace 84, extending rearwardly from the carriage 1. The roller of this brace is designed to engage the track whenever the master-wheel 4 is opposite the computing device, which latter is thus held rigidly in position to insure the maintenance of a proper relation between the elements of the computing device and the actuating mechanism mounted on the carriage.

It is thought that from the foregoing the operation of the computing mechanism will be fully comprehended. It should be understood, however, that the illustrated structure is susceptible of considerable variation and that the right to effect such changes, modifications, and variations as may fall within the scope of the protection prayed is therefore expressly reserved.

What I claim is—

1. In a computing device, a series of wheels, a series of transfer-levers each arranged to transmit motion from one wheel to another, and a series of locking-levers each arranged to be moved by one wheel to engage another wheel and to hold the same locked during the movement of a wheel or wheels of lower order.

2. In a computing device, a series of normally unlocked denominational members, carrying mechanism therefor, and means whereby when any member is carried, said member and the members of higher order will be automatically locked.

3. In a computing device, a series of denominational members, a series of locking members therefor, and means whereby one locking member will operate another.

4. In a computing device, a series of denominational members, carrying mechanism therefor, a series of locking members for the denominational members, and means whereby any locking member which is moved to its engaging position will effect a similar movement of other locking members to lock other denominational members.

5. In a computing device, a series of denominational members, carrying mechanism therefor, and locking-levers for the members, said levers having portions thereof disposed in overlapping relation, whereby the movement of any lever will cause a lever or levers at one side thereof to be moved in unison therewith without operating the levers located at the other side of the one operated.

6. In a computing device, a series of denominational members, carrying mechanism therefor, a plurality of locking-levers, each arranged to be operated by the carrying mechanism, and means whereby one locking-lever will be caused to operate another.

7. In a computing device, a series of denominational members, carrying mechanism therefor including a series of transfer-levers arranged to transmit motion from one member to another, a series of locking-levers each disposed to be operated by a transfer-lever, and means whereby any locking-lever when operated will move one or more of the other locking-levers.

8. In a computing device, a series of denominational members, carrying mechanism therefor including a series of transfer-levers, a series of counterweighted locking-levers, said locking-levers being disposed for operation by the transfer-levers, and means for restoring the transfer-levers to normal position and for withdrawing the same from the locking-levers to permit the latter to swing back to their released or unlocked positions.

9. In a computing device, a series of denominational members, carrying mechanism therefor including a series of transfer members, and locking mechanism for said transfer members, said locking mechanism being extended to the exterior of the computing device for actuation.

10. In a computing device, a series of denominational members, carrying mechanism therefor including a series of transfer members, and a series of vibrators each arranged to engage and positively lock a transfer member and extended to the exterior of the computing device for actuation.

11. In a computing device, a series of denominational members, carrying mechanism including transfer-dogs arranged to engage the members, and means for preventing carrying movement of a dog and arranged to positively move the dog into engagement with its denominational member.

12. In a computing device, a series of denominational members, carrying mechanism therefor including a series of transfer-dogs, and a locking device arranged to positively hold a dog against movement to its carrying position, said locking device being movable to release the dog for its carrying movement and to move the dog into engagement with a denominational member.

13. In a computing device, a series of denominational members, transfer members therefor, transfer-dogs carried by the members, and a device arranged to lock a transfer member in its normal position, said device being movable to release the transfer member and to move the transfer-dog into operative position.

14. In a computing device, a series of denominational members, transfer members therefor, transfer-dogs movably mounted on the transfer members, and a locking device movable to release a transfer member and to move a transfer-dog to its engaging position, said locking device being extended to the exterior of the computing device to facilitate its actuation.

15. In a computing device, a series of denominational members, carrying mechanism therefor including a series of transfer-levers, pivoted transfer-dogs carried by the levers, and a series of vibratory devices each of which normally locks a transfer-lever, but is movable to release the lever and to throw the dog carried by said lever into engagement with a denominational member.

16. In a computing device, a series of denominational members, a series of transfer members therefor, a series of locking members retained in their normal unlocked positions by the transfer members, and means for locking the transfer members against premature movement.

17. In a computing device, a series of denominational members, locators therefor, carrying mechanism including transfer-dogs, and a separate device for moving each dog into engagement with a denominational member, whereby the transfer-dogs will act as retaining devices for the members when the locators are moved out of engagement therewith.

18. In a computing device, a series of denominational members, locators therefor extended to the exterior of the computing device for actuation, carrying mechanism including transfer-dogs, and a series of vibrators each arranged to move a dog into engagement with a denominational member and extended to the exterior of the computing device for actuation.

19. In a computing device, a series of denominational members, carrying mechanism including transfer-dogs, and a series of independent devices each designed to move a dog into engagement with its member, said devices being extended to the exterior of the computing device for actuation.

20. In a computing device, a series of denominational members, a series of transfer members therefor, and a series of locking devices movable by the transfer members to engage the denominational members and also movable to their engaging positions independently of the transfer members.

21. In a computing device, a series of denominational members, carrying mechanism therefor including transfer-levers, locking devices movable by the transfer-levers but independently thereof to engage the denominational members, and a retractor for said locking devices.

22. In a computing device, a series of denominational members, carrying mechanism therefor including transfer-levers, locking-levers movable by the transfer-levers but independently thereof to engage the denominational members, a retractor for the locking-levers, mechanism for restoring the transfer-levers to normal position, and means for operating the retractor from said restoring mechanism.

23. In a computing device, a series of denominational members, carrying mechanism therefor including transfer-levers, separate locking-levers for the denominational members, a retractor for the transfer-levers, a separate retractor for the locking-levers, and operating means common to both retractors.

24. In a computing device, a series of denominational members, carrying mechanism therefor, separate locking-levers for the members, and wheel-resetting mechanism including means for restoring the carrying mechanism and the locking mechanism to normal position prior to the resetting of the denominational members.

25. In a computing device, a series of denominational members, carrying mechanism therefor, locking mechanism for the members, separate retracting devices for the carrying and locking mechanisms, wheel-resetting mechanism including a resetting-lever, and means immediately associated with the lever for operating both retracting devices.

26. In a computing device, a series of denominational members, carrying mechanism therefor, locking mechanism for the members, a resetting-lever, and means mounted on the resetting-lever to effect the retraction of the carrying mechanism and the locking mechanism to normal position prior to the resetting of the denominational members.

27. In a computing device, a series of denominational members, carrying mechanism therefor, locking mechanism for the members, a resetting-lever, and a latch-lever mounted on the resetting-lever and movable to restore both the carrying mechanism and the locking mechanism to normal position.

28. In a computing device, a series of denominational members, carrying mechanism therefor, locking mechanism for the members, a resetting-lever, a retractor for the locking mechanism, a separate retractor for the carrying mechanism, and a latch-lever mounted on the resetting-lever and arranged to operate both of said retractors.

29. In a computing device, a series of denominational members, carrying mechanism therefor, a series of locking devices each movable by one denominational member to engage another denominational member, and resetting mechanism including means for restoring the locking devices to normal position prior to the resetting of the denominational members.

30. In a computing device, a series of denominational members, carrying mechanism therefor, separate locking members for the denominational members, and resetting mechanism including means for releasing the locking members from the denominational members both before and after the resetting thereof.

31. In a computing device, a series of denominational members, carrying mechanism therefor, locking mechanism for the denominational members, said locking mechanism being separate from the carrying mechanism, a resetting-lever, a latch-lever carried by the resetting-lever, means operated by the latch-lever to release the locking members from the denominational members prior to the resetting of the latter, and means operated by the resetting-lever to release the locking members from the denominational members after the latter have been reset.

32. In a computing device, a series of denominational members, carrying mechanism therefor including transfer-levers, locking-levers for the members, and resetting mechanism including means for retracting the transfer-levers and locking-levers both before and after the resetting operation.

33. In a computing device, a series of denominational members, a series of locking members therefor, means for retracting a locking member, and means for causing said member to retract another locking member.

34. In a computing device, a series of denominational members, carrying mechanism therefor including transfer-levers, locking-levers for the denominational members, a retractor for the locking-levers, a separate retractor for the transfer-levers, a resetting-lever, and a latch-lever carried by the resetting-lever, said latch-lever being arranged to operate both retractors prior to the resetting operation and said resetting-lever being arranged to operate both retractors after the denominational members have been reset.

35. In a computing device, a plurality of denominational members, carrying mechanism therefor, a locking device arranged to positively lock the carrying mechanism in one position, and means independent of the denominational members for moving the locking device to release the carrying mechanism.

36. In a computing device, a plurality of denominational members, carrying mechanism therefor, a locking device for positively holding the carrying mechanism in its normal or inactive position, and means independent of the denominational members for operating the locking device to release the carrying mechanism.

37. In a computing device, a plurality of denominational members, carrying mechanism therefor, a locking device for positively locking the carrying mechanism against movement, and a swinging member arranged to move the locking device to release the carrying mechanism.

38. In a computing device, a series of denominational members, carrying mechanism therefor including transfer-levers, a separate locking device for each lever, and means movable independently of the denominational members for moving the said locking devices to release the levers.

39. In a computing device, a series of denominational members, carrying mechanism therefor including transfer-levers, separate locking devices for the levers, and means common to the several locking devices for moving the same to release the transfer-levers.

40. In a computing device, a series of denominational members, a series of transfer members coöperating therewith, a series of locking devices for the transfer members, and an unlocking device common to several locking devices.

41. In a computing device, a series of denominational members, carrying mechanism therefor including a series of transfer-levers, a series of vibrators each arranged to lock a transfer-lever, and a swinging yoke arranged to move the vibrators to release the levers.

42. In a computing device, a series of denominational members, a series of locking-members therefor, a series of operating members for the locking members, a series of devices for locking said operating members in their normal positions, and means for moving said devices to release the members.

43. In a computing device, a series of denominational members, a series of locking-levers for the members, a series of operating devices for said levers, and a series of vibrators, said vibrators serving to prevent premature movement of the operating devices.

44. In a computing device, a series of denominational members, a series of locking-levers, operating members therefor, a series of vibrators each arranged to positively lock an operating member in its normal position, and means for moving the vibrators to release said members.

45. In a computing device, a series of denominational members, carrying mechanism therefor including transfer-levers, separate locking-levers for the denominational members, said transfer-levers serving to move the locking-levers to their locking positions, means for locking the transfer-levers against premature movement, and means for operating the lever-locking means.

46. In a computing device, a series of denominational members, carrying mechanism therefor, means for positively locking the carrying mechanism in one position, and resetting mechanism including means movable independently of the denominational members for releasing the carrying mechanism.

47. In a computing device, a series of denominational members, carrying mechanism therefor including a series of transfer members, means for locking the transfer members in normal position, and resetting mechanism including means independent of the denominational members for simultaneously releasing the several transfer members.

48. In a computing device, a series of denominational members, carrying mechanism therefor including a series of transfer-levers, separate locking devices for the levers, and resetting mechanism including means movable independently of the denominational members for moving said locking devices to release the levers.

49. In a computing device, a series of denominational members, carrying mechanism including transfer-levers, locking devices for said levers, and a resetting-lever arranged to operate the locking devices independently of the denominational members.

50. In a computing device, a series of denominational members, carrying mechanism therefor including transfer-levers, a series of vibrators each arranged to lock a transfer-lever in its normal position, an unlocking member common to the several vibrators, and resetting mechanism including means for moving the unlocking member to effect the release of the transfer members.

51. In a computing device, a series of denominational members, carrying mechanism therefor including transfer-levers, a series of vibrators each arranged to lock a transfer-lever in its normal position, an unlocking-yoke arranged to move the several vibrators to release the transfer-levers, and a resetting-lever arranged to move the unlocking-yoke.

52. In a computing device, a series of denominational members, carrying mechanism therefor, locking mechanism for the members, locking means for the carrying mechanism, and resetting mechanism arranged to perform the following functions: to wit, the return of the transfer mechanism and member-locking mechanism to normal position prior to the resetting of the members, next the partial resetting of the denominational members and the release of the carrying mechanism, next the complete resetting of the denominational members and the operation of both the carrying mechanism and the member-locking mechanism, and finally the return of the carrying mechanism and member-locking mechanism to normal position.

53. In a computing device, a series of wheels, a series of transfer members therefor, a separately-mounted series of locking members each arranged to be moved to its engaging position by a transfer member and also movable independently of such transfer member to engage and lock a wheel.

54. In a computing device, a series of denominational wheels, carrying mechanism therefor including a series of transfer members and transfer-dogs carried by the members, said dogs being movable relative to the transfer members to engage the wheels and movable with said members to move the wheels, and a series of levers for moving the dogs relative to the transfer members to engage the wheels.

In testimony that I claim the foregoing as my own I have hereto affixed my signature in the presence of two witnesses.

JOHN ASBURY SMITH.

Witnesses:
W. T. McELROY,
ARTHUR COWDREY.